United States Patent
Takatani et al.

(10) Patent No.: US 12,057,248 B2
(45) Date of Patent: Aug. 6, 2024

(54) ELECTRICAL STEEL SHEET, LAMINATED CORE AND ROTATING ELECTRIC MACHINE

(71) Applicant: NIPPON STEEL CORPORATION, Tokyo (JP)

(72) Inventors: Shinsuke Takatani, Tokyo (JP); Kazutoshi Takeda, Tokyo (JP); Ichiro Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/913,865

(22) PCT Filed: Jun. 17, 2021

(86) PCT No.: PCT/JP2021/023028
§ 371 (c)(1),
(2) Date: Sep. 23, 2022

(87) PCT Pub. No.: WO2021/256532
PCT Pub. Date: Dec. 23, 2021

(65) Prior Publication Data
US 2023/0113264 A1    Apr. 13, 2023

(30) Foreign Application Priority Data

Jun. 17, 2020  (JP) ................. 2020-104232

(51) Int. Cl.
| | | |
|---|---|---|
| H01F 1/18 | (2006.01) | |
| B05D 7/14 | (2006.01) | |
| B32B 7/12 | (2006.01) | |
| B32B 15/04 | (2006.01) | |
| B32B 15/18 | (2006.01) | |
| C23C 22/07 | (2006.01) | |
| H01F 27/24 | (2006.01) | |
| H02K 1/02 | (2006.01) | |

(52) U.S. Cl.
CPC ............. *H01F 1/18* (2013.01); *B05D 7/148* (2013.01); *B32B 7/12* (2013.01); *B32B 15/043* (2013.01);
(Continued)

(58) Field of Classification Search
CPC .. H01F 1/18; H01F 27/24; H02K 1/02; B05D 7/148; C23C 22/07; B32B 7/12;
(Continued)

(56) References Cited

U.S. PATENT DOCUMENTS 5,124,209 A  *  6/1992  Kishi ................... C09D 5/4473
                                                      428/416
5,132,180 A  *  7/1992  Kishi ................... C09D 5/4473
                                                      428/458
(Continued)

FOREIGN PATENT DOCUMENTS

EP       3 561 153 A1    10/2019
JP       2-38042 A        2/1990
(Continued)

OTHER PUBLICATIONS

"Measurement Techniques of the Logarithmic Decrement" LB Magalas and T. Malinowski (Solid State Phenomena, vol. 89 (2003) pp. 247-260).*

(Continued)

*Primary Examiner* — Kevin R Kruer
(74) *Attorney, Agent, or Firm* — Birch, Stewart, Kolasch & Birch, LLP

(57) ABSTRACT

This electrical steel sheet is an electrical steel sheet in which at least part of either or both surfaces of a base steel sheet is coated with an insulation coating having an adhesive ability, wherein a logarithmic decrement of the insulation coating in a temperature range of 25 to 100° C. is 0.3 or less.

21 Claims, 6 Drawing Sheets

(52) U.S. Cl.
CPC .............. *B32B 15/18* (2013.01); *C23C 22/07* (2013.01); *H01F 27/24* (2013.01); *H02K 1/02* (2013.01); *B32B 2255/06* (2013.01); *B32B 2255/26* (2013.01); *B32B 2307/102* (2013.01); *B32B 2603/00* (2013.01)

(58) Field of Classification Search
CPC ... B32B 15/043; B32B 15/18; B32B 2255/06; B32B 2255/26; B32B 2307/102; B32B 2603/00
See application file for complete search history.

(56) References Cited

U.S. PATENT DOCUMENTS

| | | | | |
|---|---|---|---|---|
| 5,854,360 | A | * 12/1998 | Matsunaga | ........ C08G 18/1875 525/453 |
| 2012/0190790 | A1 | * 7/2012 | Yamaguchi | .......... C08G 18/757 524/591 |
| 2017/0117758 | A1 | 4/2017 | Nakagawa et al. | |
| 2019/0134951 | A1 | * 5/2019 | Koyama | ............... B32B 27/281 |
| 2023/0002530 | A1 | * 1/2023 | Moriwaki | ......... C08F 220/1808 |

FOREIGN PATENT DOCUMENTS

| | | |
|---|---|---|
| JP | 2000-173816 A | 6/2000 |
| JP | 6037055 B2 | 11/2016 |
| JP | 6086098 B2 | 3/2017 |
| TW | I231775 B | 5/2005 |
| WO | WO2004/070080 A1 | 8/2004 |

OTHER PUBLICATIONS

Decision to Grant a Patent for Japanese Patent Application No. 2021-559781 dated May 24, 2022.

Notice of Reasons for Refusal for Japanese Patent Application No. 2021-559781 dated Jan. 11, 2022.

* cited by examiner

ELECTRICAL STEEL SHEET, LAMINATED CORE AND ROTATING ELECTRIC MACHINE

TECHNICAL FIELD

The present invention relates to an electrical steel sheet, a laminated core and a rotating electric machine. Priority is claimed on Japanese Patent Application No. 2020-104232, filed Jun. 17, 2020, the content of which is incorporated herein by reference.

BACKGROUND ART

As a core (iron core) used in a rotating electric machine, a laminated core in which, a plurality of electrical steel sheets are bonded to each other and laminated is known. Caulking and welding are known as methods of bonding electrical steel sheets to each other. However, in caulking and welding, magnetic properties of electrical steel sheets may deteriorate due to mechanical stress and thermal stress during processing as well, as short circuiting between layers, and the performance of the laminated core may deteriorate.

As a bonding method other than caulking and welding, for example, a method of laminating electrical steel sheets having an insulation coating having an adhesive ability on the surface and adhering them to each other is known. Patent Documents 1 and 2 disclose electrical steel sheets in which the peak temperature of the logarithmic decrement of the film is controlled. Patent Document 3 discloses a laminate electrical steel sheet in which the maximum value of the logarithmic decrement of the adhesive layer (insulation coating is controlled.

CITATION LIST

[Patent Document]

[Patent Document 1]

Japanese Unexamined Patent Application. First Publication No. 2000-173816

[Patent Document 2]

Japanese Patent No. 6037055

[Patent Document 3]

Japanese Patent No. 6086098

SUMMARY OF THE INVENTION

Problems to be Solved by the Invention

In recent years further improvement in motor efficiency has been required, and further improvement in core performance has been required. Therefore, it is important to further improve the performance of electrical steel sheets having an insulation coating having an adhesive ability.

An object of the present invention is to provide an electrical steel sheet which enables production of a laminated core with improved, core performance in one or more of workability during punching of an electrical steel sheet, lamination accuracy, noise reduction by minimizing uneven curing, and achievement of both a lamination factor and adhesive strength, and a laminated core using the electrical steel sheet and a rotating electric machine.

Means for Solving the Problem

The present invention has the following configurations.

[1] An electrical steel sheet in which at least part of either or both surfaces of a base steel sheet is coated with an insulation coating having an adhesive ability, wherein a logarithmic decrement of the insulation coating in a temperature range of 25 to 100° C. is 0.3 or less.

[2] The electrical steel sheet according to [1], wherein a difference between a peak temperature of the logarithmic decrement of the insulation coating and a curing start temperature is less than 80° C., and a difference between a logarithmic decrement of the peak temperature and a logarithmic decrement of the curing start temperature is 0.1 or more.

[3] The electrical steel sheet according to [1] or [2], wherein a logarithmic decrement of the insulation coating in a temperature range of 200 to 250° C. is 0.9 or less.

[4] An electrical steel sheet in which at least part of either or both surfaces of a base steel sheet is coated with an insulation coating having an adhesive ability, wherein a difference between a peak temperature of the logarithmic decrement of the insulation coating and a curing start temperature is less than 80° C., and a difference between a logarithmic decrement of the peak temperature and a logarithmic decrement of the curing start temperature is 0.1 or more.

[5] The electrical steel sheet according to [4], wherein a logarithmic decrement of the insulation coating in a temperature range of 200 to 250° C. is 0.9 or less.

[6] An electrical steel sheet in which at least part of either or both surfaces of a base steel sheet is coated with an insulation coating having an adhesive ability, wherein a logarithmic decrement of the insulation coating in a temperature range of 200 to 250° C. is 0.9 or less.

[7] A laminated core in which a plurality of electrical steel sheets according to any one of [1] to [6] are laminated and adhered to each other.

[8] A rotating electric machine including the laminated core according to [7].

Effects of the Invention

An object of the present invention is to provide an electrical steel sheet which enables production of a laminated core with improved core performance in one or more of improvement in workability during punching of an electrical steel sheet and lamination accuracy, noise reduction by minimizing uneven curing, and achievement of both a lamination factor and adhesive strength and a laminated core using the electrical steel sheet and a rotating electric machine.

EMBODIMENT(S) FOR IMPLEMENTING THE INVENTION

Hereinafter, a laminated core according to one embodiment of the present invention, a rotating electric machine including the laminated core, and a material forming the laminated core will be described with reference to the drawings, Here, in the present embodiment, as a rotating electric machine, an electric motor, specifically, an AC electric motor, more specifically, a synchronous electric motor, and still more specifically, a permanent magnet field type electric motor will be described as an example. This type of electric motor is suitably used for, for example, an electric automobile.

Rotating Electric Machine 10

Figure 1:
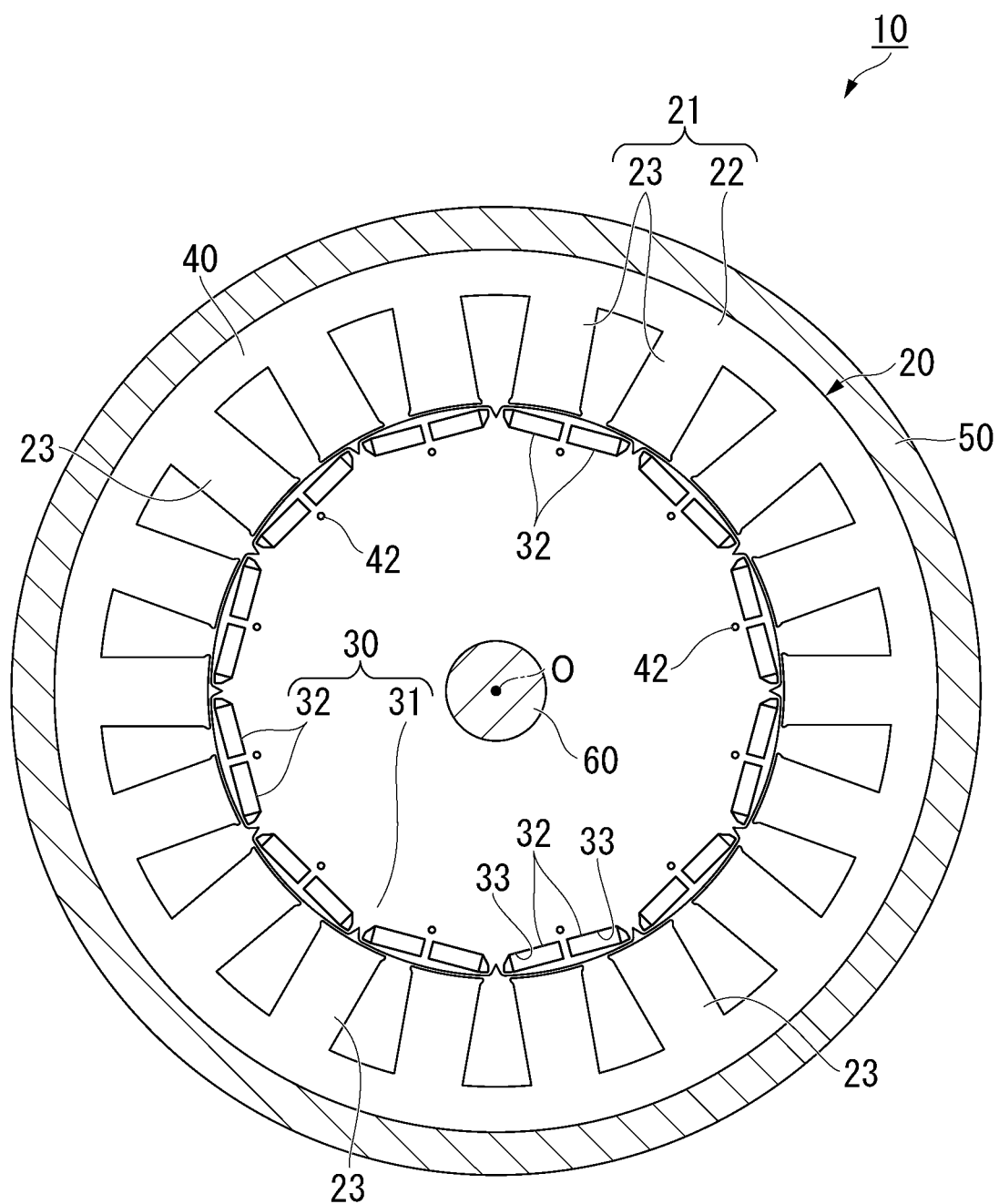
FIG. 1 is a cross-sectional view of a rotating electric machine including a laminated core according to a first embodiment of the present invention.

As shown in FIG. 1, a rotating electric machine 10 includes a stator 20, a rotor 30, a case 50, and a rotating shaft 60. The stator 20 and the rotor 30 are accommodated in the case 50. The stator 20 is fixed into the case 50.

In the present embodiment, as the rotating electric machine 10, an inner rotor type machine in which the rotor 30 is positioned inside the stator 20 in the radial direction is used. However, as the rotating electric machine 10, an outer rotor type machine in which the rotor 30 is positioned outside the stator 20 may be used. In addition, in the present embodiment, the rotating electric machine 10 is a 12-pole and 18-slot three-phase AC motor. However, the number of poles, the number of slots, the number of phases, and the like can be appropriately changed.

The rotating electric machine 10 can rotate at a rotational speed of 1,000 rpm by applying, for example, an excitation current having an effective value of 10 A and a frequency of 100 Hz to each phase.

The stator 20 includes an adhesive laminated core for a stator (hereinafter referred to as a stator core) 21 and a winding (not shown).

The stator core 21 includes a circular core back part 22 and a plurality of teeth parts 23. In the following, the center axis O direction of the stator core 21 (or the core back part 22) will be referred to as an axial direction, the radial direction (direction orthogonal to the center axis O) of the stator core 21 (or the core back part 22) will be referred to as a radial direction, and the circumferential direction (direction around the center axis O) of the stator core 21 (or the core back part 22) will be referred to as a circumferential direction.

The core back part 22 is formed in an annular shape in a plan view of the stator 20 when viewed from the axial direction.

The plurality of teeth parts 23 protrudes from the inner peripheral of the core back part 22 in a radially inward direction (toward the center axis O of the core back part 22 in the radial direction). The plurality of teeth parts 23 are arranged at equal angular intervals in the circumferential direction. In the present embodiment, 18 teeth parts 23 are provided at every 20 degrees in central angles centered on the center axis O. The plurality of teeth parts 23 are formed so that they have the same shape and the same size. Therefore, the plurality of teeth parts 23 have the same thickness size.

The winding is wound around the teeth parts 23. The winding may be centralized winding or distributed winding.

The rotor 30 is arranged inside the stator 20 (the stator core 21) in the radial direction. The rotor 30 includes a rotor core 31 and a plurality of permanent magnets 32.

The rotor core 31 is formed in a circular (annular) shape and arranged coaxially with the stator 20. The rotating shaft 60 is arranged in the rotor core 31. The rotating shaft 60 is fixed to the rotor core 31.

The plurality of permanent magnets 32 are fixed to the rotor core 31. In the present embodiment, a pair of permanent magnets 32 form one magnetic pole. The plurality of sets of permanent magnets 32 are arranged at, equal angular intervals in the circumferential direction. In the present embodiment, 12 sets (24 in total) of permanent magnets 32 are provided at every 30 degrees in central angles centered on the center axis O.

In the present embodiment, an embedded magnet type motor is used as the permanent magnet field type electric motor. In the rotor core 31, a plurality of through-holes 33 that penetrate the rotor core 31 in the axial direction are formed. The plurality of through-holes 33 are provided to correspond to the arrangement of the plurality of permanent magnets 32. The permanent magnets 32 that are arranged in the corresponding through-holes 33 are fixed to the rotor core 31. Fixing of each permanent magnet 32 to the rotor core 31 can be realized by, for example, adhering the outer surface of the permanent magnet 32 and the inner surface of the through-hole 33 with an adhesive. Here, as the permanent magnet field type electric motor, a surface magnet type motor may be used in place of the embedded magnet type.

Figure 2:
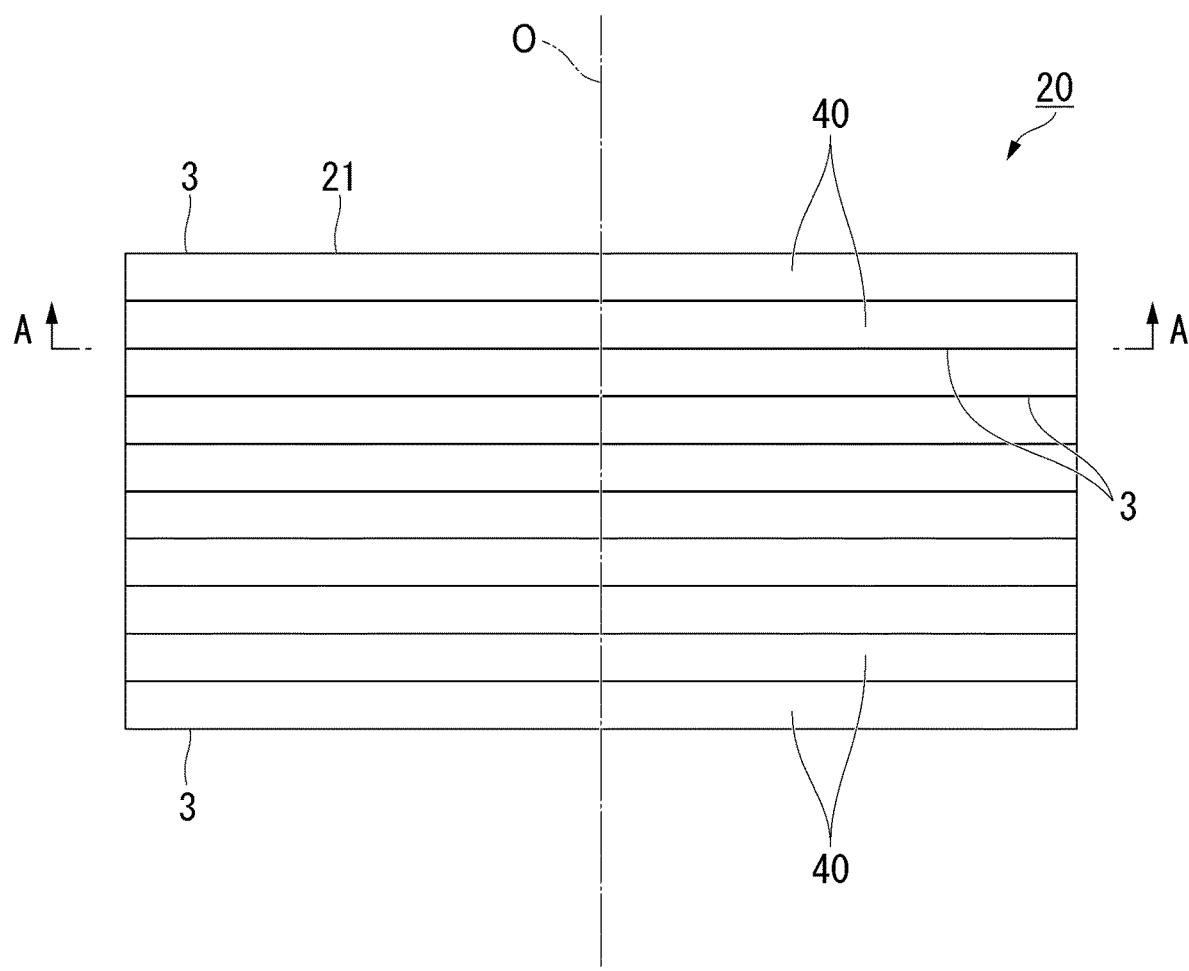
FIG. 2 is a side view of the laminated core.

Both the stator core 21 and the rotor core 31 are laminated cores. For example, as shown in FIG. 2, the stator core 21 is formed by laminating a plurality of electrical steel sheets 40 in the lamination direction.

Here, the lamination thickness (total length along the center axis O) of each of the stator core 21 and the rotor core 31 is, for example, 50.0 mm. The outer diameter of the stator core 21 is, for example, 250.0 mm. The inner diameter of the stator core 21 is, for example, 165.0 mm. The outer diameter of the rotor core 31 is, for example, 163.0 mm. The inner diameter of the rotor core 31 is, for example, 30.0 mm. However, these values are examples and the lamination thickness, the outer diameter and the inner diameter of the stator core 21, and the lamination thickness, the outer diameter and the inner diameter of the rotor core 31 are not limited to these values. Here, the inner diameter of the stator core 21 is based on the tip part of the teeth part 23 in the stator core 21. That is, the inner diameter of the stator core 21 is a diameter of an imaginary circle inscribed in the tip parts of all the teeth parts 23.

Figure 4:
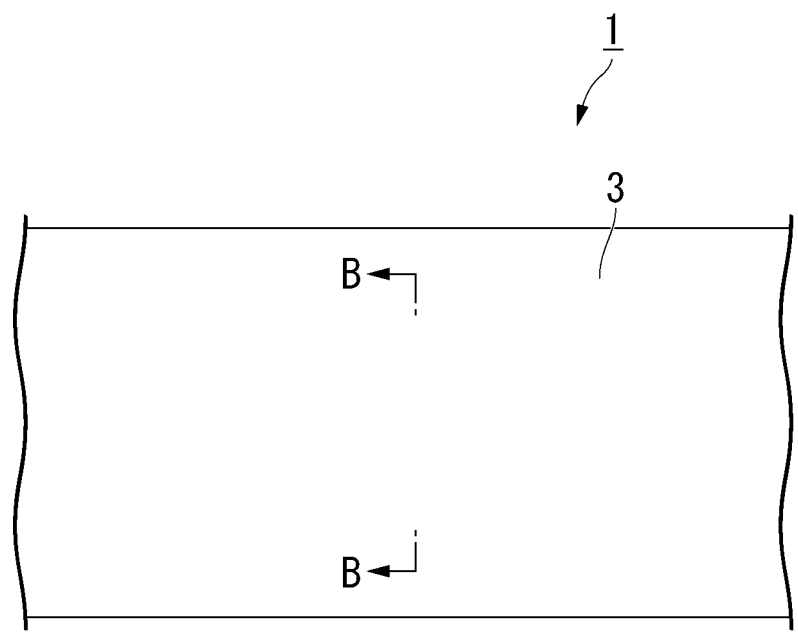
FIG. 4 is a plan view of a material forming the laminated core.
Figure 5:
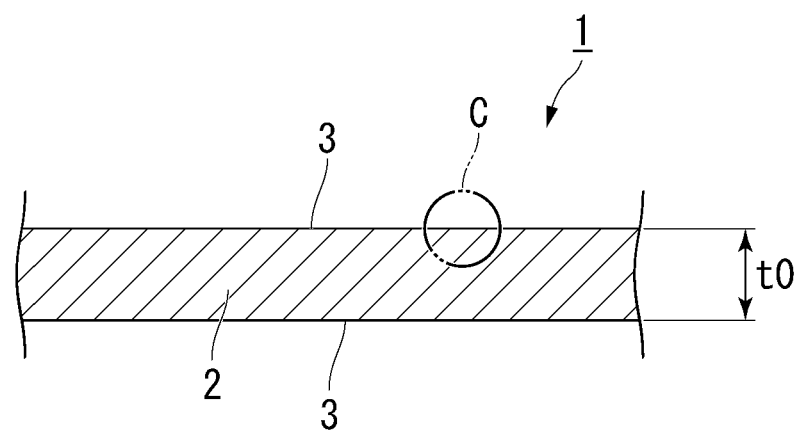
FIG. 5 is a cross-sectional view taken along the line B-B in FIG. 4.
Figure 6:
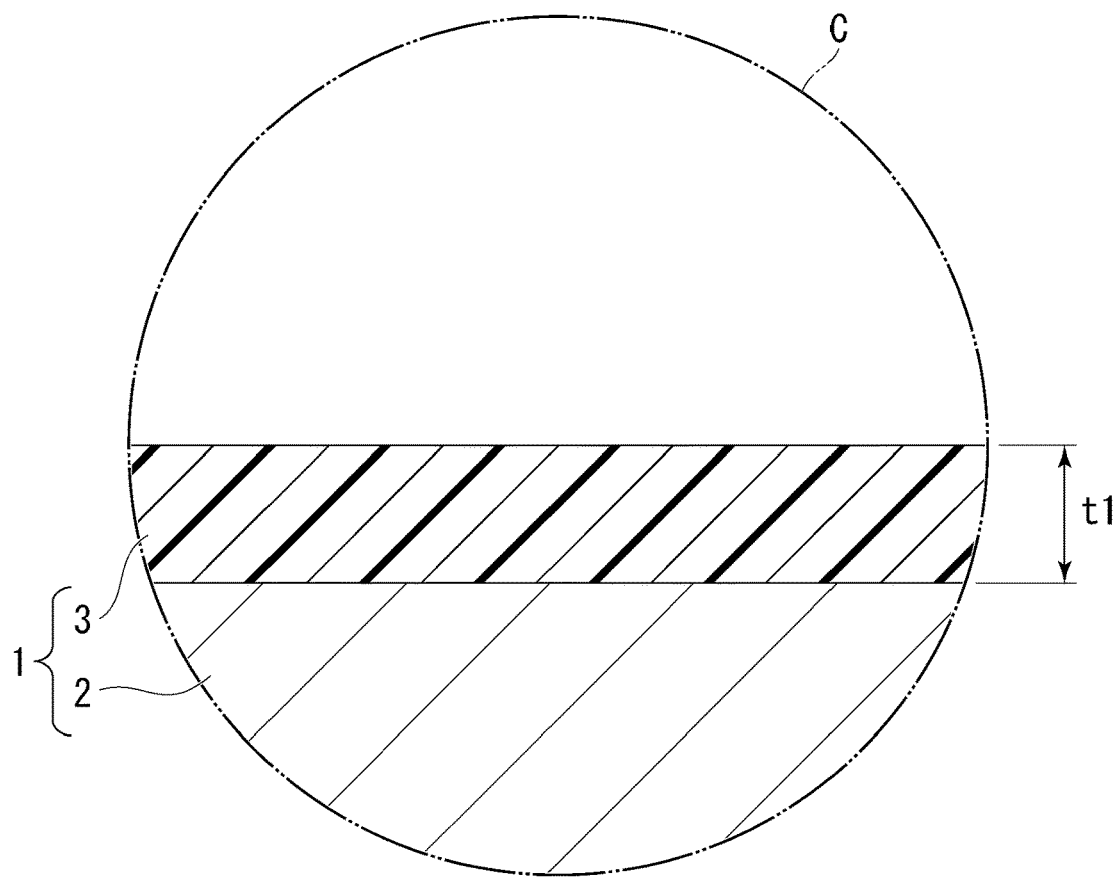
FIG. 6 is an enlarged view of part C in FIG. 5.

Each electrical steel sheet 40 forming the stator core 1 and the rotor core 31 is formed, for example, by punching a material 1 as shown in FIG. 4 to FIG. 6. The material 1 is a steel sheet (electrical steel sheet) that is a base of the electrical steel sheet 40. As the material 1, for example, a strip-shaped steel sheet and a cut sheet may be exemplified.

Although description of the laminated core is in progress, the material 1 will be described below. Here, in this specification, the strip-shaped steel sheet that is a base of the electrical steel sheet 40 may be referred to as the material 1.

A steel sheet having a shape used for a laminated core obtained by pinching the material 1 may be referred to as the electrical steel sheet 40.

Material 1

Figure 7:
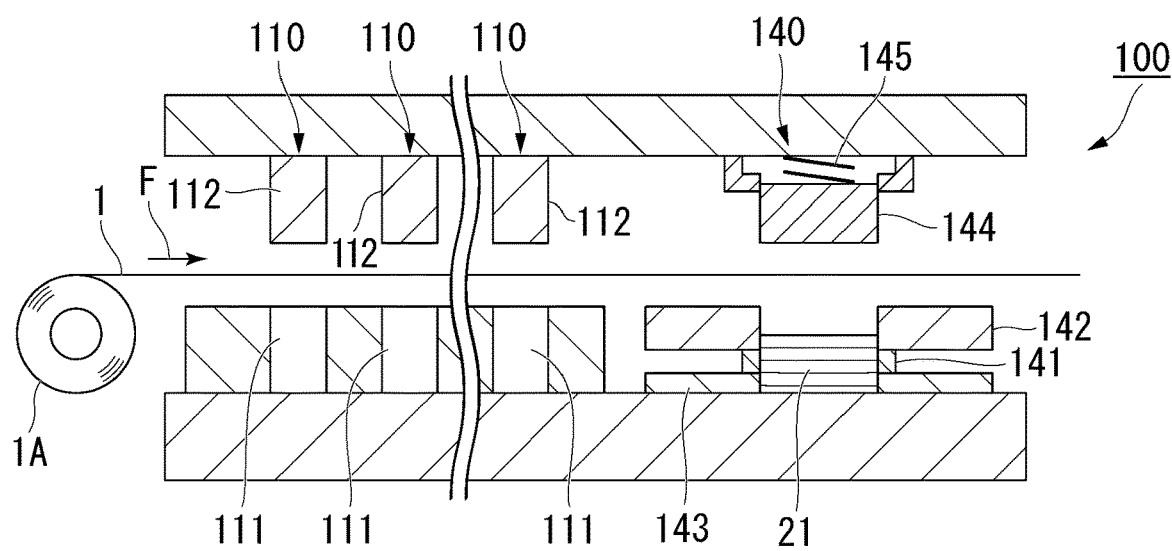
FIG. 7 is a side view of a production device used for producing the laminated core.

For example, the material 1 that is wound around a coil 1A shown in FIG. 7 is handled. In the present embodiment, a non-oriented electrical steel sheet is used as the material 1. As the non-oriented electrical steel sheet, a non-oriented electrical steel strip according to JIS C 2552: 2014 can be used. However, as the material 1, a grain-oriented electrical steel sheet may be used in, place of the non-oriented electrical steel sheet. As the grain-oriented steel sheet in this case, a grain-oriented electrical steel strip according to JIS C 2553: 2019 can be used. In addition, a non-oriented thin electrical steel strip or a grain-oriented thin electrical steel strip according to JIS C 2558: 2015 can be used.

The upper and lower limit values of an average sheet thickness t0 of the material 1 are set, for example, as follows, in consideration of a case in which the material 1 is used for the electrical steel sheet 40.

As the material 1 becomes thinner, the production cost of the material 1 increases. Therefore, in consideration of the production cost, the lower limit value of the average sheet thickness t0 of the material 1 is 0.10 mm, preferably 0.15 mm, and more preferably 0.18 mm.

On the other hand, when the material 1 is too thick, the production cost is favorable, but when the material 1 is used for the electrical steel sheet 40, the eddy current loss increases and the core iron loss deteriorates. Therefore, in consideration of the core iron loss and the production cost, the upper limit value of the average sheet thickness t0 of the material 1 is 0.65 mm, preferably 0.35 mm, and more preferably 0.30 mm.

0.20 mm may be exemplified as a value that satisfies the above range of the average sheet thickness t0 of the material 1.

Here, the average sheet thickness t0 of the material 1 includes not only the thickness of a base steel sheet 2 to be described below but also the thickness of an insulation coating 3. In addition, a method of measuring the average sheet thickness t0 of the material 1 is, for example, the following measurement method. For example, when the material 1 is wound in the shape of the coil 1A, at least part of the material 1 is unwound into a flat sheet shape. In the material 1 unwound into a flat sheet shape, a predetermined position (for example, a position separated from the edge of the material 1 in the longitudinal direction by 10% of the total length of the material 1) on the material 1 in the longitudinal direction is selected. At the selected position, the material 1 is divided into five areas in the width direction thereof. At four locations that are boundaries of these five areas, the sheet thickness of the material 1 is measured. The average value of the sheet thicknesses at four locations can be set as the average sheet thickness t0 of the material 1.

The upper and lower limit values of the average sheet thickness to of the material 1 can be naturally used as the upper and lower limit values of the average sheet thickness to of the electrical steel sheet 40. Here, a method of measuring the average sheet thickness t0 of the electrical steel sheet 40 is, for example, the following measurement method. For example; the lamination thickness of the laminated core is measured at four locations (that is, every 90 degrees around the center axis O) at equal intervals in the circumferential direction. Each of the measured lamination thicknesses at four locations is divided by the number of laminated electrical steel sheets 40 to calculate the sheet thickness per sheet. The average value of the sheet thicknesses at four locations can be set as the average sheet thickness t0 of the electrical steel sheet 40.

As shown in FIG. 5 and FIG. 6, the material 1 includes the base steel sheet 2 and the insulation coating 3. In the material 1, both surfaces of the strip-shaped base steel sheet 2 are covered with the insulation coating 3. In the present embodiment, most of the material 1 is formed with the base steel sheet 2, and the insulation coating 3 thinner than the base steel sheet 2 is laminated on the surface of the base steel sheet 2.

The chemical composition of the base steel sheet 2 includes 2.5% to 4.5% of Si in mass %, as shown below in units of mass %. Here, when the chemical composition is within the above range, the yield strength of the material 1 (the electrical steel sheet 40) can be set to, for example, 380 MPa or more and 540 MPa or less.

Si: 2.5% to 4.5%
Al: 0.001% to 3.0%
Mn: 0.05% to 5.0%
The remainder: Fe and impurities When the material 1 is used for the electrical steel sheet 40, the insulation coating 3 exhibits insulation performance between the electrical steel sheets 40 adjacent to each other in the lamination direction. In addition, in the present embodiment, the insulation coating 3 has an adhesive ability, and adheres the electrical steel sheets 40 adjacent to each other in the lamination direction. The insulation coating 3 may have a single-layer structure or a multi-layer structure. More specifically, for example, the insulation coating 3 may have a single-layer structure having both insulation performance and an adhesive ability, or may have a multi-layer structure including a underlying insulation coating having exceptional insulation performance and a top insulation coating having exceptional adhesive performance.

Whether the insulation coating 3 has an adhesive ability can be confirmed by, for example, the following method. Two rectangular electrical steel sheets having a width of 30 mm and a length of 60 mm are cut out from the electrical steel sheet 40, and tip parts having a width of 30 mm and a length of 10 mm are made to overlap each other and adhered at a steel sheet temperature of 180° C., a pressure of 10 MPa, and a pressurization time of 1 hour to produce a sample. Then, the shear tensile strength of the sample is measured at an atmospheric temperature of 25° C. and a tensile speed of 3 mm/min, and the numerical value divided by the adhesion area is set as an adhesive strength (MPa). If the obtained adhesive strength is 2.5 MPa or more, it can be determined that the insulation coating 3 has an adhesive ability.

In the present embodiment, the insulation coating 3 entirely covers both the surfaces of the base steel sheet 2 without gaps. However, as long as the above insulation performance and adhesive, ability are secured, part of the layer of the insulation coating 3 does not have to cover both surfaces of the base steel sheet 2 without gaps. In other words, part of the layer of the insulation coating 3 may be provided intermittently on the surface of the base steel sheet 2. However, in order to secure the insulation performance, both surfaces of the base steel sheet 2 need to be covered with the insulation coating 3 so that none of surface is posed. Specifically, when the insulation coating 3 does not have a underlying insulation coating having exceptional insulation performance and has a single-layer structure having both insulation performance and an adhesive ability, the insulation coating 3 needs to be formed over the entire surface of the base steel sheet 2 without gaps. On, the other hand, when the insulation coating 3 has a multi-layer structure having a underlying insulation coating having exceptional insulation performance and a top insulation coating having an exceptional adhesive ability, even if the underlying insulation coating is formed over the entire surface of the base steel sheet without gaps and the top insulation coating is intermittently provided in addition to forming both the underlying insulation coating, and the top insulation coating over the entire surface of the base steel sheet 2 without gaps, it is possible to achieve both the insulation performance and the adhesive ability.

The coating composition for forming a underlying insulation coating is not particularly limited, and for example, a general treatment agent such as a chromic acid-containing treatment agent or a phosphate-containing treatment can be used.

The insulation coating having an, adhesive ability is formed by applying a coating composition for an electrical steel sheet to be described above onto a base steel sheet. The insulation coating, having an adhesive ability is, for example, an insulation coating having a single-layer structure having both insulation performance and an adhesive ability or a top insulation coating provided on a underlying insulation coating. The insulation coating having an adhesive ability is in an uncured state or a semi-cured state (B stage) before heating and pressurizing when a laminated core is produced, a curing reaction proceeds by heating during heating and pressurizing, and an adhesive ability is exhibited.

The insulation coating 3 satisfies any one or more of the following three conditions (1) to (3).

Condition (1): the logarithmic decrement in a temperature range of 25 to 100° C. is 0.3 or less.

Condition (2): a difference (T1-T2) between a peak temperature T1 (° C.) of the logarithmic decrement and a curing start temperature T2 (° C.) is less than 80° C., and a difference ($\Delta$1-$\Delta$2) between the logarithmic decrement ($\Delta$1) of the peak temperature and a logarithmic decrement ($\Delta$2) of the curing start temperature is 0.1 or more. Here, the peak temperature T1 corresponds to the glass transition temperature of the insulation coating having an exceptional adhesive ability and is hardly affected by the underlying insulation coating even in, the case of the multi-layer structure.

Condition (3): the logarithmic decrement in a temperature range of 200 to 250° C. is 0.9 or less.

The logarithmic decrement in the conditions (1) to (3) is measured at a temperature rise rate of 10° C./sec by a rigid pendulum test using a rigid pendulum at the cylinder edge according to ISO 12013-2. When the logarithmic decrement is measured, the dynamic viscoelasticity of the film can be evaluated. The logarithmic decrement can be measured using a commercially available rigid pendulum type physical property tester, for example RPT-3000W (commercially available from A&D Co., Ltd.). The measurement temperature range of the logarithmic decrement can be appropriately set, and can be, for example, from room temperature (25° C.) to 300° C.

In the measurement by the rigid pendulum test, the larger the logarithmic reduction rate, the softer the film. The condition (1) defines properties in a temperature range of 25 to 100° C. corresponding to a glass region of the insulation coating 3. "The logarithmic decrement in a temperature range of 25 to 100° C. is 0.3 or less" means that the logarithmic decrement in a temperature range of 25 to 100° C. is always 0.3 or less. That is, it means that the maximum value $\Delta_{max}(1)$ of the logarithmic decrement in a temperature range of 25 to 100° C. is 0.3 or less.

When the logarithmic decrement in a temperature range of 25 to 100° C. is 0.3 or less, the change in the logarithmic decrement due to the temperature rise in this temperature range becomes small, and stickiness due to softening of the insulation coating 3 is unlikely to occur. Therefore, the workability during punching of the electrical steel sheet 40 is exceptional, and the lamination accuracy of the electrical steel sheet 40 is high. In addition, it is possible to reduce noise caused by deterioration of the lamination, accuracy of the electrical steel sheet 40 and the decrease in the adhesive strength between electrical steel sheets.

The logarithmic decrement in a temperature range of 25 to 100° C. is preferably 0.25 or less and more preferably 0.2 or less.

In the measurement of the logarithmic decrement by the rigid pendulum test, the peak temperature observed when the temperature rises from the glass region corresponds to the glass transition temperature of the film. The condition (2) defines properties in a temperature range from the peak temperature of the logarithmic decrement to the curing start temperature corresponding to a rubber region of the insulation coating 3. If the difference (T1-T2) between the peak temperature of the logarithmic decrement and the curing start temperature is less than 80° C., and the difference ($\Delta$1-$\Delta$2) between the logarithmic decrement of the peak temperature and the logarithmic decrement of the curing start temperature is 0.1 or more, the curing rate of the insulation coating 3 during heating and pressurizing between the electrical steel sheets 40 is high and uneven curing is unlikely to occur. Thereby, a difference in adhesive strength between the plurality of steel sheets is unlikely to occur, and uneven rigidity is less likely to occur in the core, thus reducing noise during operation.

The upper limit value of the difference (T1-T2) is preferably 75° C., and more preferably 70° C. so that uneven curing of the insulation coating 3 is unlikely to occur and a noise reduction effect is high. The lower limit value of the difference (T1-T2) is preferably 30° C. and more preferably 40° C. so that the occurrence of cracks of the insulation coating 3 due to rapid curing is easily reduced.

The lower limit value of the difference ($\Delta$1-$\Delta$2) is preferably 0.1 and more preferably 0.2 so that uneven curing, of the insulation coating 3 is unlikely to occur and a noise reduction effect is high. The upper limit value of the difference ($\Delta$1-$\Delta$2) is preferably 0.5, and more preferably 0.4 so that the occurrence of cracks of the insulation coating 3 is easily reduced.

Here, in the case of an insulation coating that exhibits an adhesive ability according to curing, in a temperature-logarithmic decrement curve obtained in the rigid pendulum test, there is a singular point (inflection point) at which the absolute value of the slope decreases toward zero and then increases again in a decrease region after the peak temperature. In the present invention, the temperature corresponding to the inflection point (point at which the logarithmic decrement rapidly decreases) in a decrease region after the peak temperature in this temperature-logarithmic decrement curve is defined as the curing start temperature T2.

The lower limit value of the peak temperature T1 of the logarithmic decrement is preferably 100° C., and more preferably 110° C. In addition, the upper limit value of the peak temperature T1 of the logarithmic decrement is preferably 140° C., and more preferably 130° C.

The lower limit value of the curing start temperature T2 is preferably 160° C., and more preferably 170° C. In addition, the upper limit value of the curing start temperature T2 is preferably 200° C., and more preferably 190° C.

The condition (3) defines properties in a temperature range of 200 to 250° C. corresponding to the region of the insulation coating 3 after curing starts. "The logarithmic decrement in a temperature range of 200 to 250° C. is 0.9 or less" means that the logarithmic decrement in a temperature range of 200 to 250° C. is always 0.9 or less. That is, it means that the maximum value $\Delta_{max}(2)$ of the logarithmic decrement in a temperature range of 200 to 250° C. is 0.9 or less.

In temperature range, of 200 to 250° C., if the logarithmic decrement is 0.9 or less, the insulation coating 3 after curing is hard, and even if the sheet thickness of the insulation coating 3 is reduced, the electrical steel sheets 40 are adhered to each other with a high adhesive strength. Therefore, it is possible to achieve both the lamination factor of the core and the adhesive strength between the electrical steel sheets 40.

The logarithmic decrement in a temperature range of 200 to 250° C. is preferably 0.85 or less, and more preferably 0.80 or less.

The logarithmic decrement can be controlled according to the type of the coating composition for an electrical steel sheet used for forming the insulation coating 3, baking conditions (temperature, time, etc.) for the coating composition for an electrical steel sheet on the base steel sheet and the like. For example, if the baking temperature is higher, the logarithmic decrement tends to decrease. If the baking time is longer, the logarithmic decrement tends to decrease.

The coating composition for an electrical steel sheet is not particularly limited, and examples thereof include a composition containing an epoxy resin and an epoxy resin curing agent. That is, as the insulation coating having an adhesive ability, a coating containing an epoxy resin and an epoxy resin curing agent may be exemplified as an example.

As the epoxy resin, a general epoxy resin can be used, and specifically, any epoxy resin having two or more epoxy groups in one molecule can be used without particular limitation. Examples of such epoxy resins include bisphenol A type epoxy resins, bisphenol F type epoxy resins, phenol novolak type epoxy resins, cresol novorak type epoxy resins, alicyclic epoxy resins, glycidyl ester type epoxy resins, glycidylamine type epoxy resins, hydantoin type epoxy resins, isocyanurate type epoxy resins, acrylic acid-modified epoxy resins (epoxy acrylate), phosphorus-containing epoxy resins, and halides thereof (brominated epoxy resins, etc.), hydrogen additives and the like. The epoxy resins may be used alone or two or more thereof may be used in combination.

The coating composition for an electrical steel sheet may contain an acrylic resin.

The acrylic resin is not particularly limited. Examples of monomers used for acrylic resins include unsaturated carboxylic acids such as acrylic acid and methacrylic acid, and (meth)acrylates such as methyl (meth)acrylate, ethyl (meth)acrylate, n-butyl (meth)acrylate, isobutyl (meth)acrylate, cyclohexyl (meth)acrylate, 2-ethylhexyl (meth)acrylate, 2-hydroxyethyl (meth)acrylate, and hydroxypropyl (meth)acrylate. Here, the (meth)acrylate is acrylate or methacrylate. The acrylic resins may be used alone or two or more thereof may be used in combination.

The acrylic resin may have a structural unit derived from a monomer other than an acrylic monomer. Examples of other monomers include ethylene, propylene, and styrene. The other monomers may be used, alone or two or more thereof may be used in combination.

When an acrylic resin is used, it may be used as an acrylic-modified epoxy resin obtained by grafting an acrylic resin onto an epoxy resin. In the coating composition for an electrical steel sheet, it may be contained as a monomer forming an acrylic resin.

As the epoxy resin curing agent, a heat curing type agent having latency can be used, and examples thereof include aromatic polyamines, acid anhydrides, phenolic curing agents, dicyandiamides, boron trifluoride-amine complexes, and organic acid hydrazides. Examples of aromatic polyamines include m-phenylenediamine, diaminodiphenylmethane, and diaminodiphenyl sulfone. Examples of phenolic curing agents include phenol novolak resins, cresol novolak resins, bisphenol novolak resins, triazine-modified phenol novolak resins, and phenol resol resins. Among these, as the epoxy resin curing agent, a phenolic curing agent is preferable and a phenol resol resin is more preferable. The epoxy resin curing agents may be used alone or two or more thereof may be used in combination.

The content of the epoxy resin curing agent in the coating composition for an electrical steel sheet with respect to 100 parts by mass of the epoxy resin is preferably 5 to 35 parts by mass and, more preferably 10 to 30 parts by mass.

The coating composition for an electrical steel sheet may contain additives such as a curing accelerator (curing catalyst), an emulsifier, and an anti-foaming agent. The additives may be used alone or two or more thereof may be used in combination.

The insulation coating 3 can be formed, for example, by applying a coating composition for an electrical steel sheet to the surface of the base steel sheet and performing drying and baking.

The lower limit value of the reaching temperature during baking is preferably 120° C., more preferably 130° C., and still more preferably 150° C. The upper limit value of the reaching temperature during baking is preferably 200° C., more preferably 190° C., and still more preferably 160° C.

The lower limit value of the baking time is preferably 20 seconds, and more preferably 30 seconds. The upper limit value of the baking time is preferably 70 seconds, and more preferably 60 seconds.

When the glass transition temperature of the insulation coating 3 is set as Tg, the baking temperature is preferably in a range of Tg+20° C. to Tg+50° C.. When the baking temperature is in a range of Tg+20° C. to Tg+50° C., the logarithmic decrement of the insulation coating 3 in a temperature range of 25 to 100° C. may be 0.3 or less.

The temperature rise rate during baking is preferably 5° C./s to 20° C./s. When the temperature rise rate is 5° C./s, to 20° C./s, the logarithmic decrement of the insulation coating 3 in a temperature range of 25 to 100° C. may be 0.3 or less.

The upper and lower limit values of an average thickness t1 of the insulation coating 3 are set, for example, as follows, in consideration of a case in which the material 1 is used for the electrical steel sheet 40.

When the material 1 is used for the electrical steel sheet 40, the average thickness t1 of the insulation coating 3 (the thickness per one surface of the electrical steel sheet 40 (the material 1)) is adjusted so that the insulation performance and adhesive ability between the electrical steel sheets 40 laminated with each other can be secured.

In the case of the insulation coating 3 having a single-layer structure, the average thickness t1 of the insulation coating 3 (the thickness per one surface of the electrical steel sheet 40 (the material 1)) may be, for example, 1.5 μm or more and 8.0 μm or less.

In the case of the insulation coating 3 having a multi-layer structure, the average thickness of the underlying insulation coating may be, for example, 0.3 µm or more and 1.2 µm, and is preferably 0.7 µm or more and 0.9 µm or less. The average thickness of the top insulation coating may be, for example, 1.5 µm or more and 8.0 µm or less.

Here, a method of measuring the average thickness t1 of the insulation coating 3 in the material 1 is the same as that of the average sheet thickness t0 of the material 1, and the average thickness can be determined by obtaining the thickness of the insulation coating 3 at a plurality of, locations and averaging these thicknesses.

The upper and lower limit values of the average thickness t1 of the insulation coating 3 in the material 1 can be naturally used as the upper and lower limit values of the average thickness t1 of the insulation coating 3 in the electrical steel sheet 40. Here, a method of measuring the average thickness t1 of the insulation coating 3 in the electrical steel sheet 40 is, for example, the following measurement method. For example, among the plurality of electrical steel sheets forming the laminated core, the electrical steel sheet 40 positioned on the outmost side in the lamination direction (the electrical steel sheet 40 whose surface is exposed in the lamination direction) is selected. On the surface of the selected electrical steel sheet 40, a predetermined position in, the radial direction (for example, a position exactly at the middle (center) between the inner peripheral edge and the outer peripheral edge of the electrical steel sheet 40) is selected. At the selected position, the thickness of the insulation coating 3 of the electrical steel sheet 40 is measured at four locations (that is, every 90 degrees around the center axis O) at equal intervals in the circumferential direction. The average value of the measured thicknesses at four, locations can be set as the average thickness t1 of the insulation coating 3.

Here, the reason why the average thickness t1 of the insulation coating 3 is measured on the electrical steel sheet 40 positioned on the outmost side in the lamination direction in this manner is that the insulation coating 3 is formed so that the thickness of the insulation coating 3 hardly changes at the lamination position in the lamination direction of the electrical steel sheet 40.

The electrical steel sheet 40 is produced by punching the material 1 as described above, and the adhesive core (the stator core 21 and the rotor core 31) is produced using the electrical steel sheet 40.

Method of Laminating Laminated Core

Figure 3:
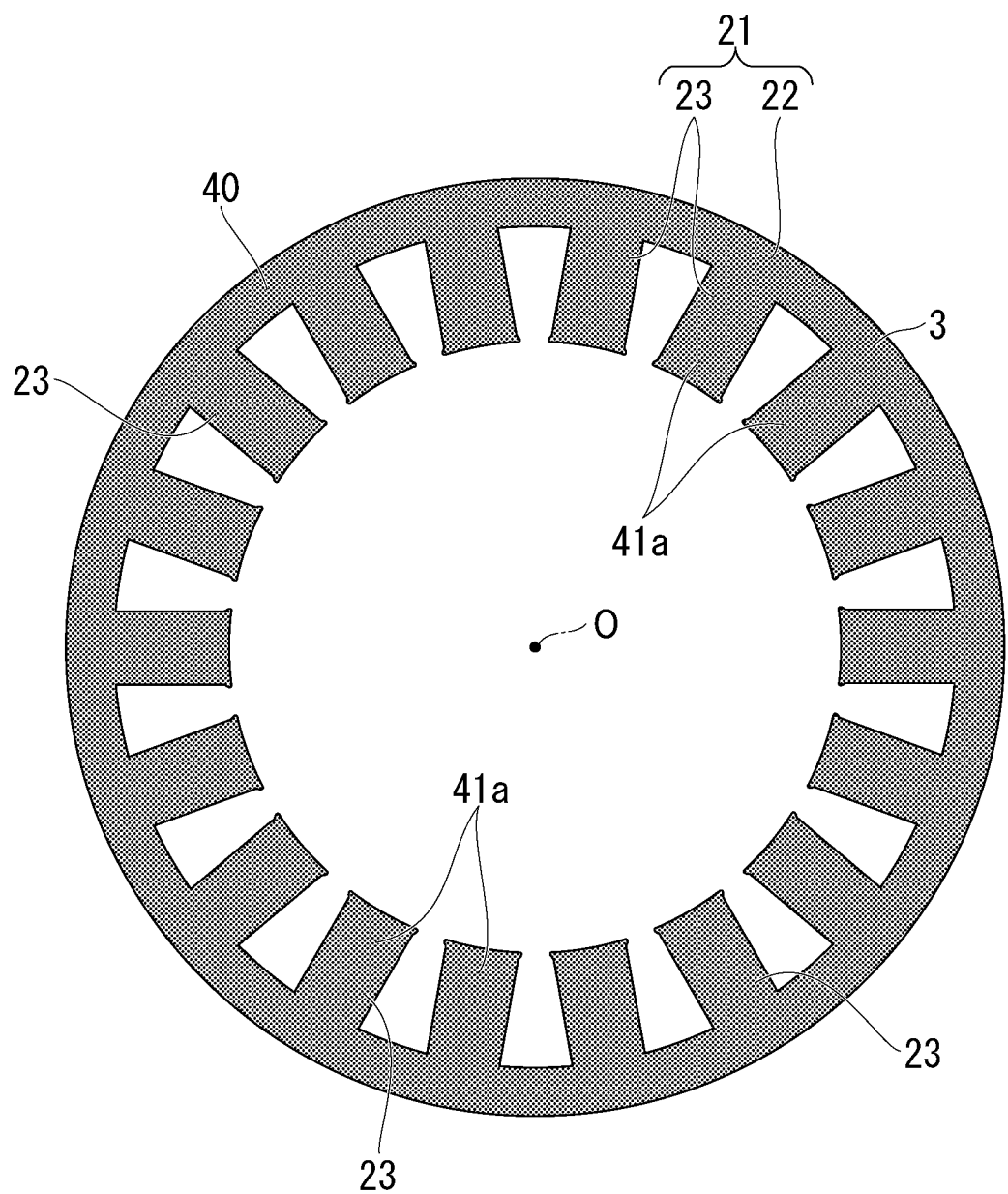
FIG. 3 is a cross-sectional view taken along the line A-A in FIG. 2.

Hereinafter, description will return to the laminated core. As shown in FIG. 3, the plurality of electrical steel sheets 40 forming the stator core 21 are laminated via the insulation coating 3.

The electrical steel sheets 40 adjacent to each other in the lamination direction are adhered over the entire surface with the insulation coating 3. In other words, a surface of the electrical steel sheet 40 (hereinafter referred to as a first surface) facing the lamination direction is an adhesive area 41a over the entire surface. However, the electrical steel sheets 40 adjacent to each other in the lamination direction may not be adhered over the entire surface. In other words, on the first surface of the electrical steel sheet 40, the adhesive area 41a and the non-adhesive area (not shown) may be mixed.

In the present embodiment, the plurality of electrical steel sheets forming the rotor core 31 are fixed to each other by a caulking 42 (joggle) shown in FIG. 1. However, the plurality of electrical steel sheets forming the rotor core 31 may also have a laminate structure, fixed by the insulation coating 3 as in the stator core 21.

In addition, the laminated core such as the stator core 21 and the rotor core 31 may be formed by so-called rotating stacking.

Method of Producing Laminated Core

The stator core 21 is produced, for example, using a production device 100 shown in FIG. 7. Hereinafter, in description of the production method, first, the laminated core production device 100 (hereinafter simply referred to, as the production device 100) will be described.

In the production device 100, while the material 1 is sent out from the coil 1A (hoop) in the arrow F direction, it is punched a plurality of times using molds arranged on stages, and gradually formed into the shape of the electrical steel sheet 40. Then, the punched electrical steel sheets 40 are laminated and pressurized while raising the temperature. As a result, the electrical steel sheets 40 adjacent to each other in the lamination direction are adhered to each other with the insulation coating 3 (that is, part of the insulation coating 3 positioned in the adhesive area 41a is caused to exhibit an adhesive ability), and the adhesion is completed.

As shown in FIG. 7, the production device 100 includes a plurality of stages of punching stations 110. The punching station 110 may have two stages or three or more stages. The punching station 110 of each stage includes a female mold 111 arranged below the material 1 and a male mold 112 arranged above the material 1.

The production device 100 further includes a lamination station 140 at a position downstream from the most downstream punching station 110. The lamination station 140 includes a heating device 141, an outer peripheral punching female mold 142, a heat insulation member 143, an outer peripheral punching male mold 144, and a spring 145.

The heating device 141, the outer peripheral punching female mold 142, and the heat insulation member 143 are arranged below the material 1. On the other hand, the outer peripheral punching male mold 144 and the spring 145 are arranged above the material 1. Here, reference numeral 21 indicates a stator core.

In the production device 100 having the configuration described above, first, the material 1 is sequentially sent out from the coil 1A in the arrow F direction in FIG. 7. Then, the material 1 is sequentially punched on the plurality of stages of punching stations 110. According to these punching procedures, in the material 1, the shape of the electrical steel sheet 40 having the core back part 22 and the plurality of teeth parts 23 shown in FIG. 3 is obtained. However, since the material is not completely punched at this time, it proceeds to the next process in the arrow F direction.

Then, finally, the material 1 is sent out to the lamination station 140, punched out by the outer peripheral punching male mold 144, and laminated with high accuracy. During this lamination, the electrical steel sheet 40 receives a certain pressurizing force from the spring 145. When the punching process and the lamination process as described above are sequentially repeated, a predetermined number of electrical steel sheets 40 can be stacked. In addition, the laminated core formed by stacking the electrical steel sheets 40 in this manner is heated to for example, a temperature of 200° C., by the heating device 141. According to this heating, the insulation coatings 3 of the adjacent electrical steel sheets 40 are adhered to each other.

Here, the heating device 141 may not be arranged on the outer peripheral punching female mold 142. That is, it may be taken out of the outer peripheral punching female mold 142 before the electrical steel sheet 40 laminated with the outer peripheral punching female mold 142 is adhered. In this case, the outer peripheral punching female mold 142 may not have the heat insulation member 143. In addition, in this case, the stacked electrical steel sheets 40 before adhesion may be sandwiched and held from both sides in the lamination direction with a jig (not shown) and then transported and heated.

According to the above processes, the stator core 21 is completed.

As described above, in the present invention, the insulation coating having an adhesive ability of the electrical steel sheet satisfies any one or more of the conditions (1) to (3). According to the condition (1), the workability and lamination accuracy during punching of the electrical steel sheet are improved, and effects of reducing noise and improving the adhesive strength between electrical, steel sheets are obtained according to improvement in the lamination accuracy. According to the condition (2), the effect of reducing noise by minimizing uneven curing is obtained. According to the condition (3), it is possible to achieve both the lamination factor and the adhesive strength between electrical steel sheets. If all of, the conditions (1) to (3) are satisfied, a laminated core with core performance is improved in, all of the workability during punching of the electrical steel sheet, the lamination accuracy of electrical steel sheets, noise reduction, the lamination factor, and the adhesive strength between electrical steel sheets can be obtained.

Here, the technical scope of the present invention is not limited to the above embodiment, and various modifications can be made without departing from the spirit of the present invention.

The shape of the stator core is not limited to the form shown in the above embodiment. Specifically, the sizes of the outer diameter and, the inner diameter of the stator core, the lamination thickness, the number of slots, the size ratio between the circumferential direction and the radial direction of the teeth part, the size ratio between the teeth part and the core back part in the radial direction, and the like can be arbitrarily designed according to desired properties of the rotating electric machine.

In the rotor in the above embodiment, a pair of permanent magnets 32 form one magnetic pole, but the present invention is not limited thereto. For example, one permanent magnet 32 may form one magnetic pole, or three or more permanent magnets 32 may form one magnetic pole.

In the above embodiment, the permanent magnet field, type electric motor has been described as the rotating electric machine as an example, but the structure of the rotating electric machine is not limited thereto as will be exemplified below, and additionally, various known structures not exemplified bellow can also be used.

In the above embodiment, the permanent magnet field type electric motor has been described as the rotating electric machine as an example, but the present invention is not limited thereto. For example, the rotating electric machine may be a reluctance type electric motor or an electromagnet field type electric motor (winding field type electric motor).

In the above embodiment, the synchronous electric motor has been described as the AC electric motor as an example, but the present invention is not limited thereto. For example, the rotating electric machine may be an induction electric motor.

In the above embodiment, the AC electric motor has been described as the electric motor as an example, but the present invention is not limited thereto. For example, the rotating electric machine may be a DC electric motor.

In the above embodiment, the electric motor has been described as the rotating electric machine as an example, but the present invention is not limited thereto. For example, the rotating electric machine may be a generator.

In the above embodiment, a case in which the laminated core according to the present invention is applied to the stator core has been exemplified, but the laminated core can be applied to the rotor core.

The laminated core can be applied for a transformer in place of the rotating electric machine. In this case, as the electrical steel sheet, it is preferable to use a grain-oriented electrical steel sheet in place of a non-electrical steel sheet.

In addition, constituent elements in the above embodiment can be appropriately replaced with well-known constituent elements without departing from the spirit of the present invention, and the above modified examples may be appropriately combined.

EXAMPLES

Hereinafter, the present invention will be described in detail with reference to examples, but the present invention is not limited to the following description.

Rigid Pendulum Test

A test piece with a length of 50 mm and a width of 20 mm was cut out from the electrical steel strip produced in each example. A rigid pendulum test using a rigid pendulum with the cylinder edge was performed on the insulation coating of the test piece according to ISO12013-2 and a temperature-logarithmic decrement curve was obtained. As the rigid pendulum type physical property testing machine, RPT-3000W (commercially available from A&D Co., Ltd.) was used. The temperature rise rate was 10° C./sec and the measurement temperature range was 25 to 300° C.

Workability During Punching

From the electrical steel strip produced in each example, 10 electrical steel sheets having an outer diameter of 250.0 mm and an inner diameter of 165.0 mm were punched out in the shape illustrated in FIG. 3 and the workability was evaluated according to the following evaluation criteria.
(Evaluation Criteria)
  A: No stickiness due to softening of the insulation coating occurred, punching was easy, and the lamination accuracy was high.
  B: Stickiness due to softening of the insulation coating occurred, punching was difficult, and the lamination accuracy was poor.

Lamination Accuracy 130 electrical steel sheets produced in the above [workability during punching] test were laminated, and adhered at a steel sheet temperature of 200QC a pressure of 10 MPa, and a pressurization time of 1 hour to produce a laminated core. For the obtained laminated core, the thickness of the laminate sheet at 10 locations in the width direction was measured, and the lamination accuracy was evaluated by the average deviation thereof. When the average deviation of the thicknesses of the laminate sheet was less than ½ of the sheet thickness of one electrical steel sheet, it was evaluated as "exceptional," when it was ½ or more and less than 1, it was evaluated as "satisfactory," and when it was 1 or more, it was evaluated as "poor."

Striking Sound Test (Noise Evaluation)

130 electrical steel sheets produced in the above [workability during punching] test were laminated, and adhered at a steel sheet temperature of 200° C., a pressure of 10MPa, and a pressurization time of 1 hour to produce a laminated core (stator core).

The outer peripheral end of the core back part of the stator core was vibrated in the radial direction with an impact hammer, and vibration noise modal analysis was performed with the tip of the teeth part and the central part of the core back part in the direction of 180° in the axial direction with respect to the vibration source as measurement points. In addition, even when the central part of the core back part in the radial direction was vibrated in the axial direction with an impact hammer, vibration noise modal analysis was performed with the tip of the teeth part and the central part of the core back part in the direction of 180° in the axial direction with respect to the vibration source as measurement points. The evaluation was performed according to the following criteria. A smaller numerical value indicates that noise could be reduced more. In the following evaluation, 1 to 4 were satisfactory, and 5 was unsatisfactory. Here, "-" indicates that it was not measured.

1: Only one or two vibration peaks were detected.
2: Several vibration peaks were detected.
3: 10 or more vibration peaks were detected depending on the vibration direction.
4: There was a main peak, but 10 or more vibration peaks were detected.
5: There was no main peak, and 10 or more vibration peaks were detected.

Lamination Factor 130 electrical steel sheets produced in the above [workability during punching] test were laminated, and adhered at a steel sheet temperature of 200° C., a pressure of 10 MPa, and a pressurization time of 1 hour to produce a laminated core. For the obtained laminated core, the lamination factor (%) was calculated from the following formula.

Lamination Factor (%)=$M/(D \cdot h \cdot S) \times 100$

However, M indicates the mass (kg) of the laminated core, D indicates the density (kg/m$^3$) of the base steel sheet, h indicates the average height (m) of the laminated core, and S indicates the area (m$^2$) of the electrical steel sheet in a plan view. The area S of the electrical steel sheet was obtained by capturing the electrical steel sheet before lamination as an image with a scanner and performing image analysis.

Adhesive Strength

Two rectangular electrical steel sheets having a width of 30 mm and a length of 60 mm were cut out from the electrical steel strip produced in each example, and tip parts having a width of 30 mm and a length of 10 mm were made to overlap each other and adhered at a steel sheet temperature of 180° C. a pressure of 10 MPa, and a pressurization time of 1 hour to produce a sample. The shear tensile strength was measured at an atmospheric temperature of 25° C. and a tensile speed of 3 mm/min, and the numerical value divided by the adhesion area was set as an adhesive strength (MPa). An adhesive strength of 2.5 MPa or more was satisfactory.

Example 1

As the base steel sheet, a strip-shaped non-oriented electrical steel sheet containing, in mass %, Si: 3.0%, Mn: 0.2%, and Al: 0.5%, with the remainder being Fe and impurities and having a sheet thickness of 0.25 mm and a width of 300 mm was used. The surface of the base steel sheet was subjected to a base treatment using a non-chromium-based base treatment agent so that the coating amount was 1.0 g/m$^2$ to form a underlying insulation coating.

Figure 8:
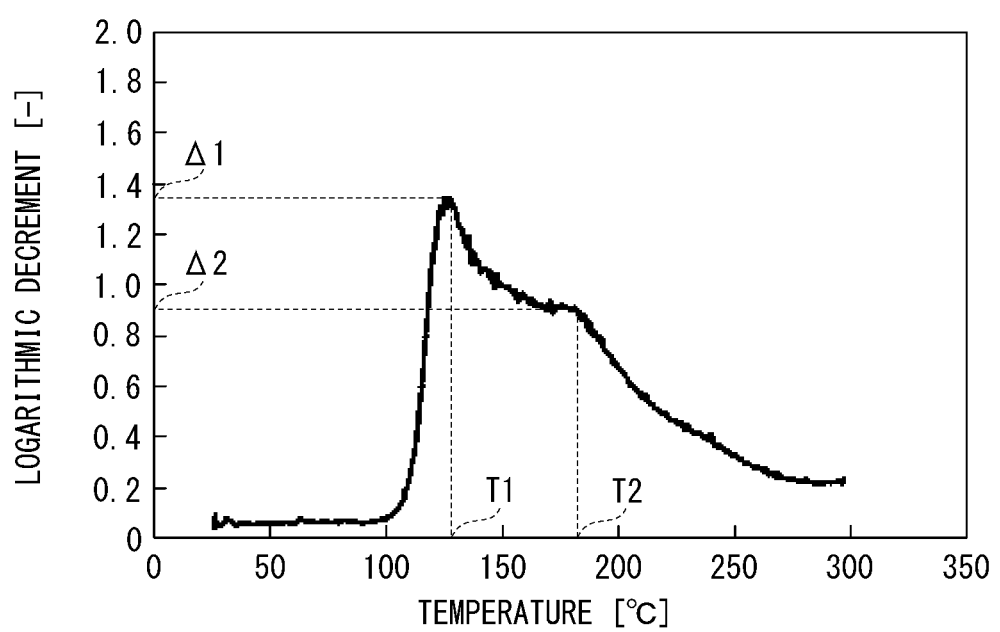
FIG. 8 is a diagram showing a temperature-logarithmic decrement curve measured for an insulation coating of Example 1.

100 parts by mass of a liquid bisphenol F type epoxy resin and 25 parts by mass of a liquid phenol resol resin, as an epoxy resin curing agent were mixed to prepare a coating composition for an electrical steel sheet. The obtained coating composition for an electrical steel sheet was applied onto the underlying insulation coating so that the coating amount was 1.0 g/m$^2$, the temperature was raised to 160° C. at a temperature rise rate of 10° C./min, baking was then performed at 160° C. for 60 seconds, and a top insulation coating was formed to obtain an electrical steel strip. FIG. 8 shows the results of the logarithmic decrement of the formed insulation coating having a multi-layer structure measured by the rigid pendulum test.

Examples 2 to 9

Electrical steel strips were obtained in the same manner as in Example 1 except that the temperature rise, rate during baking and the baking temperature (the reaching temperature during baking) were changed as shown in Table 1.

Table 1 shows the baking temperatures of the coating compositions for an electrical steel sheet during production in the examples, and the measurement results of the rigid pendulum test for the insulation coatings, and the evaluation results. Here, in Table 1, "difference (T1-T2)" indicates the difference (° C.) between the peak temperature (T1) of the logarithmic decrement and the curing start temperature (T2). In Table 1, Tg in the difference (° C.) between the baking temperature and Tg is a peak temperature (T1) (° C.). "Difference (Δ1-A2)" indicates a difference between the logarithmic decrement (Δ1) of the peak temperature and the logarithmic decrement (Δ2) of the curing start temperature. $\Delta_{max}(1)$ indicates a maximum value of the logarithmic decrement in a temperature range of 25 to 100° C. $\Delta_{max}(2)$ indicates a maximum value of the logarithmic decrement in a temperature range of 200 to 250° C.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Temperature rise rate (° C./s) | 10 | 10 | 10 | 5 | 10 | 10 | 10 | 3 | 25 |
| Difference between baking temperature and Tg (° C.) | 35 | 20 | 14 | 85 | 10 | 25 | 85 | 40 | 40 |
| Baking temperature [° C.] | 160 | 150 | 140 | 200 | 120 | 140 | 210 | 160 | 160 |
| $\Delta_{max}(1)$ | 0.1 | 0.2 | 0.8 | 0.2 | 0.6 | 0.4 | 0.2 | 0.4 | 0.6 |
| Peak temperature (T1) [° C.] | 125 | 130 | 126 | 115 | 110 | 115 | 125 | 110 | 115 |
| Curing start temperature (T2) [° C.] | 180 | 178 | 179 | 198 | 209 | 175 | 180 | 193 | 199 |
| Difference (T1 − T2) [° C.] | 55 | 48 | 53 | 83 | 99 | 60 | 55 | 83 | 84 |
| Logarithmic decrement of T1 ($\Delta 1$) | 1.4 | 1.6 | 1.5 | 1.25 | 1.26 | 1.6 | 1.5 | 1.4 | 1.3 |
| Logarithmic decrement of T2 ($\Delta 2$) | 1 | 1.1 | 1 | 1.21 | 1.2 | 1.3 | 1.2 | 1.32 | 1.24 |
| Difference ($\Delta 1 - \Delta 2$) | 0.4 | 0.5 | 0.5 | 0.04 | 0.06 | 0.3 | 0.3 | 0.08 | 0.06 |
| $\Delta_{max}(2)$ | 0.85 | 0.8 | 1.1 | 1 | 0.85 | 0.8 | 1.0 | 1.0 | 1.1 |
| Workability during punching | A | A | B | A | B | B | A | B | B |
| Lamination accuracy | Exceptional | Satisfactory | Poor | Satisfactory | Satisfactory | Satisfactory | Exceptional | Poor | Poor |
| Striking sound test (noise evaluation) | 1 | 1 | 2 | 3 | 1 | 1 | 1 | 5 | 5 |
| lamination factor [%] | 98.3 | 98.7 | 96.5 | 97.9 | 98.5 | 98.4 | 98.1 | 97.7 | 97.8 |
| Adhesive strength [MPa] | 6.3 | 7.2 | 5.5 | 5.2 | 3.5 | 5.8 | 6.1 | 1.8 | 2.2 |

An adhesive strength of 2.5 MPa or more was satisfactory. As shown in Table 1, compared to Example 3 in which $\Delta_{max}(1)$ was more than 0.3, in Examples 1 and 2 in which $\Delta_{max}(1)$ was 0.3 or less, the workability during punching of the electrical steel sheet was better, the lamination accuracy was higher, the noise of the laminated core was reduced, and the adhesive strength between electrical steel sheets was higher. In addition, compared to Example 3 in which $\Delta_{max}(2)$ was more than 0.9, in Examples 1 and 2 in which $\Delta_{max}(2)$ was 0.9 or less, the core performance was improved in terms of the lamination factor of the laminated core and the adhesive strength between electrical steel sheets. In Example 4 in, which $\Delta_{max}(1)$ was 0.3 or less, the workability during punching was exceptional, and the adhesive strength was exceptional. In Example 5 in which $\Delta_{max}(2)$ was 0.9 or less, the lamination factor and the adhesive strength were exceptional. In Example 6 in which the difference (T1-T2) was less than 80° C., the difference ($\Delta T1-\Delta 2$) was 0.1 or more, and $\Delta_{max}(2)$ was 0.9 or less, the striking sound test, the lamination factor, and the adhesive strength were exceptional. In Example 7 in which $\Delta_{max}(1)$ was 0.3 or less, the difference (T1-T2) was less than 80° C., and the difference ($\Delta T1-\Delta 2$) was 0.1 or more, the lamination accuracy, the striking sound test, and the adhesive strength were exceptional. In Example 8 in which the temperature rise rate was 3° C./s, none of the requirements of the present invention were satisfied, and the adhesive strength did not satisfy 2.5 MPa. In Example 9 in which the temperature rise rate was 25° C./s, none of the requirements of the present invention were satisfied, and the adhesive strength did not satisfy 2.5 MPa.

INDUSTRIAL AVAILABILITY

According to the present invention, it is possible to produce a laminated core with improved core performance in one or more of improvement in workability during punching of the electrical steel sheet and the lamination accuracy, noise reduction by minimizing uneven curing, and achievement of both the lamination factor and adhesive strength. Therefore, its industrial availability is great.

BRIEF DESCRIPTION OF THE REFERENCE SYMBOLS

1 Material
2 Base steel sheet
3 Insulation coating
10 Rotating electric machine
20 Stator
21 Stator core
40 Electrical steel sheet

The invention claimed is:
1. An electrical steel sheet, comprising:
a base steel sheet comprising, in mass %:
Si: 2.5% to 4.5%,
Al: 0.001% to 3.0%,
Mn: 0.05% to 5.0%, and
a remainder of Fe and impurities; and
an electrical insulation coating comprising an epoxy resin and an epoxy resin curing agent,
wherein:
at least a part of either or both surfaces of the base steel sheet is coated with the electrical insulation coating;

the electrical insulation coating has an adhesive strength of 2.5 MPa or more, and exhibits electrical insulation performance with respect to the electrical steel sheet;
wherein the adhesive strength is measured by a method in which two rectangular electrical steel sheet portions having a width of 30 mm and a length of 60 mm are cut out from the electrical steel sheet, and tip parts having a width of 30 mm and a length of 10 mm are made to overlap each other and adhered at a steel sheet temperature of 180° C., a pressure of 10 MPa, and a pressurization time of 1 hour to produce a sample, then a shear tensile strength of the sample is measured at an atmospheric temperature of 25° C. and a tensile speed of 3 mm/min to give a numerical value, and the numerical value divided by an adhesion area yields the adhesive strength; and
a logarithmic decrement of the electrical insulation coating in a temperature range of 200 to 250° C. is 0.9 or less,
wherein the logarithmic decrement is measured by a rigid pendulum test using rigid pendulum tester RPT-3000W at a temperature rise rate of 10° C./sec according to ISO 12013-2.

2. A laminated core in which a plurality of electrical steel sheets according to claim 1 are laminated and adhered to each other.

3. A rotating electric machine comprising the laminated core according to claim 2.

4. The electrical steel sheet according to claim 1, wherein the base steel sheet has a thickness of 0.10 mm to 0.65 mm.

5. The electrical steel sheet according to claim 1, wherein the base steel sheet comprises, in mass %:
Si: 3.0%,
Al: 0.5%,
Mn: 0.2%, and
a remainder of Fe and impurities, and
wherein the base steel sheet has a sheet thickness of 0.25 mm and a width of 300 mm.

6. An electrical steel sheet, comprising:
a base steel sheet comprising, in mass %:
Si: 2.5% to 4.5%,
Al: 0.001% to 3.0%,
Mn: 0.05% to 5.0%, and
a remainder of Fe and impurities; and
an electrical insulation coating comprising an epoxy resin and an epoxy resin curing agent,
wherein:
at least a part of either or both surfaces of the base steel sheet is coated with the electrical insulation coating;
the electrical insulation coating has an adhesive strength of 2.5 MPa or more, and exhibits electrical insulation performance with respect to the electrical steel sheet;
wherein the adhesive strength is measured by a method in which two rectangular electrical steel sheet portions having a width of 30 mm and a length of 60 mm are cut out from the electrical steel sheet, and tip parts having a width of 30 mm and a length of 10 mm are made to overlap each other and adhered at a steel sheet temperature of 180° C., a pressure of 10 MPa, and a pressurization time of 1 hour to produce a sample, then a shear tensile strength of the sample is measured at an atmospheric temperature of 25° C. and a tensile speed of 3 mm/min to give a numerical value, and the numerical value divided by an adhesion area yields the adhesive strength; and
a logarithmic decrement of the electrical insulation coating in a temperature range of 25 to 100° C. is 0.3 or less; and
a difference between a peak temperature, in a temperature-logarithmic decrement curve, of the logarithmic decrement of the electrical insulation coating and a curing start temperature is less than 80° C., and a difference between a logarithmic decrement of the peak temperature and a logarithmic decrement of the curing start temperature is 0.1 or more,
wherein the logarithmic decrement is measured by a rigid pendulum test using rigid pendulum tester RPT-3000W at a temperature rise rate of 10° C./sec according to ISO 12013-2, and
wherein the curing start temperature is a singular point at which the absolute value of the slope decreases toward zero and then increases again in a decrease region after the peak temperature in a temperature-logarithmic decrement curve.

7. The electrical steel sheet according to claim 6, wherein a logarithmic decrement of the electrical insulation coating in a temperature range of 200 to 250° C. is 0.9 or less.

8. A laminated core in which a plurality of electrical steel sheets according to claim 7 are laminated and adhered to each other.

9. A rotating electric machine comprising the laminated core according to claim 8.

10. A laminated core in which a plurality of electrical steel sheets according to claim 6 are laminated and adhered to each other.

11. A rotating electric machine comprising the laminated core according to claim 10.

12. The electrical steel sheet according to claim 6, wherein the base steel sheet has a thickness of 0.10 mm to 0.65 mm.

13. The electrical steel sheet according to claim 6, wherein the base steel sheet comprises, in mass %:
Si: 3.0%,
Al: 0.5%,
Mn: 0.2%, and
a remainder of Fe and impurities, and
wherein the base steel sheet has a sheet thickness of 0.25 mm and a width of 300 mm.

14. An electrical steel sheet, comprising:
a base steel sheet comprising, in mass %:
Si: 2.5% to 4.5%,
Al: 0.001% to 3.0%,
Mn: 0.05% to 5.0%, and
a remainder of Fe and impurities; and
an electrical insulation coating comprising an epoxy resin and an epoxy resin curing agent,
wherein:
at least a part of either or both surfaces of the base steel sheet is coated with the electrical insulation coating;
the electrical insulation coating has an adhesive strength of 2.5 MPa or more, and exhibits electrical insulation performance with respect to the electrical steel sheet;
wherein the adhesive strength is measured by a method in which two rectangular electrical steel sheet portions having a width of 30 mm and a length of 60 mm are cut out from the electrical steel sheet, and tip parts having a width of 30 mm and a length of 10 mm are made to overlap each other and adhered at a steel sheet temperature of 180° C., a pressure of 10 MPa, and a pressurization time of 1 hour to produce a sample, then a shear tensile strength of the sample is measured at an atmospheric temperature of 25° C. and a tensile speed of 3 mm/min to give a numerical value, and the numerical value divided by an adhesion area yields the adhesive strength; and a difference between a peak temperature, in a temperature-logarithmic decrement curve, of a logarithmic decrement of the electrical insulation coating and a curing start temperature is less than 80° C., and a difference between a logarithmic decrement of the peak temperature and a logarithmic decrement of the curing start temperature is 0.1 or more, wherein the logarithmic decrement is measured by a rigid pendulum test using rigid pendulum tester RPT-3000W at a temperature rise rate of 10° C./sec according to ISO 12013-2, and wherein the curing start temperature is a singular point at which the absolute value of the slope decreases toward zero and then increases again in a decrease region after the peak temperature in a temperature-logarithmic decrement curve.

15. A laminated core in which a plurality of electrical steel sheets according to claim 14 are laminated and adhered to each other.

16. A rotating electric machine comprising the laminated core according to claim 15.

17. The electrical steel sheet according to claim 14, wherein a logarithmic decrement of the electrical insulation coating in a temperature range of 200 to 250° C. is 0.9 or less.

18. A laminated core in which a plurality of electrical steel sheets according to claim 17 are laminated and adhered to each other.

19. A rotating electric machine comprising the laminated core according to claim 18.

20. The electrical steel sheet according to claim 14, wherein the base steel sheet has a thickness of 0.10 mm to 0.65 mm.

21. The electrical steel sheet according to claim 14, wherein the base steel sheet comprises, in mass %:
Si: 3.0%,
Al: 0.5%,
Mn: 0.2%, and
a remainder of Fe and impurities, and
wherein the base steel sheet has a sheet thickness of 0.25 mm and a width of 300 mm.

* * * * *